(12) United States Patent
Siering et al.

(10) Patent No.: US 9,356,328 B2
(45) Date of Patent: May 31, 2016

(54) APPARATUS FOR VOLTAGE SUPPLY

(71) Applicant: Bayerische Motoren Werke Aktiengesellschaft, Munich (DE)

(72) Inventors: Sebastian Siering, Munich (DE); Robert Lustig, Munich (DE); Micha Dirmeier, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 71 days.

(21) Appl. No.: 14/204,000

(22) Filed: Mar. 11, 2014

(65) Prior Publication Data

US 2014/0193686 A1 Jul. 10, 2014

Related U.S. Application Data

(63) Continuation of application No. PCT/EP2012/068482, filed on Sep. 20, 2012.

(30) Foreign Application Priority Data

Oct. 18, 2011 (DE) .......................... 10 2011 084 660

(51) Int. Cl.
*H01M 10/613* (2014.01)
*H01M 10/42* (2006.01)
*H01M 2/10* (2006.01)
(Continued)

(52) U.S. Cl.
CPC ........ *H01M 10/5004* (2013.01); *H01M 2/1072* (2013.01); *H01M 10/0413* (2013.01); *H01M 10/0481* (2013.01); *H01M 10/4207* (2013.01); *H01M 10/613* (2015.04);
(Continued)

(58) Field of Classification Search
CPC ............ H01M 10/613; H01M 10/625; H01M 10/647; H01M 2/1077; H01M 8/04029; H01M 10/6556; H01M 10/6557
See application file for complete search history.

(56) References Cited

U.S. PATENT DOCUMENTS

| 5,985,483 A | 11/1999 | Verhoog et al. |
| 2003/0087149 A1 | 5/2003 | Ando et al. |

(Continued)

FOREIGN PATENT DOCUMENTS

| CN | 101978549 A | 2/2011 |
| DE | 102 38 235 A1 | 3/2004 |

(Continued)

OTHER PUBLICATIONS

International Search Report dated Jan. 17, 2013 (Four (4) pages.

(Continued)

*Primary Examiner* — Stewart Fraser
(74) *Attorney, Agent, or Firm* — Crowell & Moring LLP

(57) ABSTRACT

An arrangement for supplying power, particularly for supplying power to a motor vehicle, includes a cell module having several storage cells arranged between a first and a second plate-type element. The cell module further includes a plate-type cooling element thermally conductively connected with the bottom sides of the storage cells, and a cooling duct system being provided in the interior of the cooling element. The cooling duct system is in a fluidic connection with at least one coolant/refrigerant inlet and at least one coolant/refrigerant outlet. The at least one coolant/refrigerant inlet and the at least one coolant/refrigerant outlet are arranged in the area of a top face of the first and/or the second plate-type element.

15 Claims, 5 Drawing Sheets

(51) Int. Cl.
    *H01M 10/04*     (2006.01)
    *H01M 10/625*     (2014.01)
    *H01M 10/6556*     (2014.01)
    *H01M 10/6567*     (2014.01)
    *H01M 10/647*     (2014.01)

(52) U.S. Cl.
    CPC ....... *H01M 10/625* (2015.04); *H01M 10/6556* (2015.04); *H01M 10/6567* (2015.04); *H01M 10/647* (2015.04)

(56) References Cited

U.S. PATENT DOCUMENTS

| | | | |
|---|---|---|---|
| 2009/0123819 A1 | 5/2009 | Kim | |
| 2011/0020676 A1 | 1/2011 | Kurosawa | |
| 2011/0206967 A1* | 8/2011 | Itsuki | B60K 1/04 429/120 |
| 2012/0183823 A1* | 7/2012 | Von Borck | H01M 2/1061 429/81 |
| 2012/0188714 A1* | 7/2012 | Von Borck | H01M 2/1061 361/688 |

FOREIGN PATENT DOCUMENTS

| | | | | |
|---|---|---|---|---|
| DE | 10 2008 034 874 A1 | | 1/2010 | |
| DE | WO 2010121831 A1 | * | 10/2010 | ......... H01M 2/1061 |
| EP | 2 362 464 A1 | | 8/2011 | |
| JP | 2011-34775 A | | 2/2011 | |

OTHER PUBLICATIONS

German-language Office Action dated Jul. 13, 2012 (Five (5) pages).

Chinese Office Action dated Jul. 13, 2015, with English translation (Fifteen (15) pages).

Chinese Office Action issued in Chinese counterpart application No. 201280031805.1 dated Jan. 27, 2016, with partial English translation (Five (5) pages).

* cited by examiner

APPARATUS FOR VOLTAGE SUPPLY

CROSS REFERENCE TO RELATED APPLICATIONS

This application is a continuation of PCT International Application No. PCT/EP2012/068482, filed Sep. 20, 2012, which claims priority under 35 U.S.C. §119 from German Patent Application No. 10 2011 084 660.3, filed Oct. 18, 2011, the entire disclosures of which are herein expressly incorporated by reference.

BACKGROUND AND SUMMARY OF THE INVENTION

The present invention relates to an arrangement for supplying power, particularly for supplying power to a motor vehicle.

For the vehicle drive, hybrid vehicles and purely electric vehicles require an efficient electric energy storage device. Several "storage elements" or storage cells can be interconnected to form a so-called "cell module". An energy storage device, in turn, may consist of several such cell modules. During the operation, considerable heat output may occur in an electric energy storage device. At least in some operating states, an active cooling is therefore necessary in order to avoid an "overheating" of the energy storage device.

It is an object of the invention to create an arrangement for supplying power which has a cooling device having a construction that is as simple and compact as possible and can easily be connected to a cooling or coolant circuit.

This object is achieved by means of the characteristics set forth in the independent claims. Advantageous embodiments and further developments of the invention are contained in the subclaims.

The starting point of the invention is an arrangement for supplying power, particularly for the power supply of an electric drive of a motor vehicle. The arrangement has a cell module which, in turn, has several mutually electrically interconnected storage cells. The individual storage cells may be arranged, for example, in a row behind one another, in a rectangular grid, or in a different manner relative to one another. They may have circular-cylindrical or angular housings.

Storage cells of a cell module arranged behind one another are arranged between a first and a second plate-type element. The plate-type elements may be called "pressure plates". It may be provided that the pressure plates are clamped together by means of tension elements (so-called "tensioning straps"). As a result, it is avoided that the cell module significantly deforms during the operation.

The storage cells of a cell module are arranged on a plate-type cooling element and preferably are connected in a thermally conductive manner with the plate-type cooling element. It may be provided that longitudinal axes of the storage cells are perpendicularly oriented on the plate-type cooling element. Bottom sides or side faces of the storage cells may be connected with the cooling element, for example, by means of a thermally conductive adhesive.

In the cooling element, a cooling duct system is provided which has at least one inlet and at least one outlet. A coolant or a refrigerant may flow through the cooling duct system. In this context, a "coolant" is liquid in any operating state. A "refrigerant" is a substance which, during the operation, may partially or completely assume a liquid and/or gaseous state, depending on the momentary temperature conditions and pressure conditions. The cooling duct system of the cooling element may thereby, for example, be connected to a refrigerant circuit of a vehicle air-conditioning system.

According to the invention, the at least one inlet and/or the at least one outlet of the cooling duct system is arranged in the area of the "top face" of the first and/or of the second plate-type element.

"In the area of a top face" means in an area which is spaced at least some distance from the plate-type cooling element or faces away from the plate-type cooling element. The inlet and the outlet are preferably arranged on a top face of the first and/or of the second plate-type element and therefore actually facing away from the plate-type cooling element. An arrangement of the inlet and of the outlet in the area of the top face of one of the plate-type elements or of the plate-type elements has the advantage that a first cell module can be "added directly in the row" to a second cell module. In addition, an accessibility of the inlet and of the outlet "from above" facilitates the mounting or the connection to a coolant or refrigerant system, to a coolant or refrigerant circuit, particularly if at least one cell module is already accommodated in a space-optimized housing.

According to a further development of the invention, a connection duct is provided in (in the sense of "in the interior") or at the first and/or the second plate-type element, which duct extends from the cooling duct system of the plate-type cooling element to the inlet, and a connection duct is provided which extends from the cooling duct system to the outlet. In the case of such an arrangement, a differentiation is made in the terminology with respect to the cooling duct system integrated in the plate-type cooling element, the inlet and the outlet as well is the connection ducts by which the inlet and the outlet respectively are connected with the cooling duct system.

In (in the sense of "in the interior") or at the first and/or the second plate-type element, a duct may be provided which extends from the cooling duct system to the inlet as well as a duct which extends from the cooling duct system to the outlet.

According to a further development of the invention, the duct extending from the cooling duct system to the inlet forms the first connection duct and the duct extending from the cooling duct system to the outlet forms the second connection duct, the coolant and refrigerant flowing directly in these ducts. If these ducts are integrated in the first and/or the second plate-type element, it may be provided that the coolant or refrigerant flows directly in these ducts, i.e. directly in the plate-type element(s).

The inlet and/or the outlet may be an integral component of the first and second plate-type element respectively. As an alternative, the inlet and/or the outlet may be implemented by separate flange elements which are connected with the connection ducts.

As an alternative, it may be provided that the connection ducts, which connect the cooling duct system provided in the plate-type cooling element with the inlet and the outlet respectively, are separate components arranged in the ducts, which ducts are provided on or in the first and/or the second plate-type element. An arrangement of the connection ducts in the ducts, which are provided in the or at the first and/or second plate-type element, has the advantage that the connection ducts can be thermally insulated with respect to the ducts. The connection ducts are preferably arranged in the ducts in such a manner that they do not come in direct contact with the ducts.

The connection ducts can be connected with the cooling duct system in a material-bonding manner. One of their ends may, for example, be soldered to an outlet or to an inlet of the cooling duct system. Likewise, the inlet and the outlet can be connected in a material-bonding manner with the other ends of the connection ducts, for example, by soldered connections.

One or more of the above-described cell modules may be inserted into a storage device housing or battery housing.

A separate cooling element is assigned to each of the cell modules. The cooling element of a cell module is preferably thermally insulated with respect to the storage device housing. This may particularly be achieved in that the cooling element of a cell module does not come in direct contact with the storage device housing. For example, thermally poorly conductive (i.e. thermally insulating) spacers or a flat insulating layer may be inserted between a bottom side of a cooling element of a cell module and a top face of a floor of the storage device housing. In particular, the spacers or the insulating layer may be elastic.

As an alternative to the above, it may be provided that the plate-type elements, which clamp the storage cells of a cell module together, lie or stand by means of supports on the floor of the storage device housing and are thermally uncoupled from the cooling element.

In the following, the invention will be explained in detail in connection with the drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
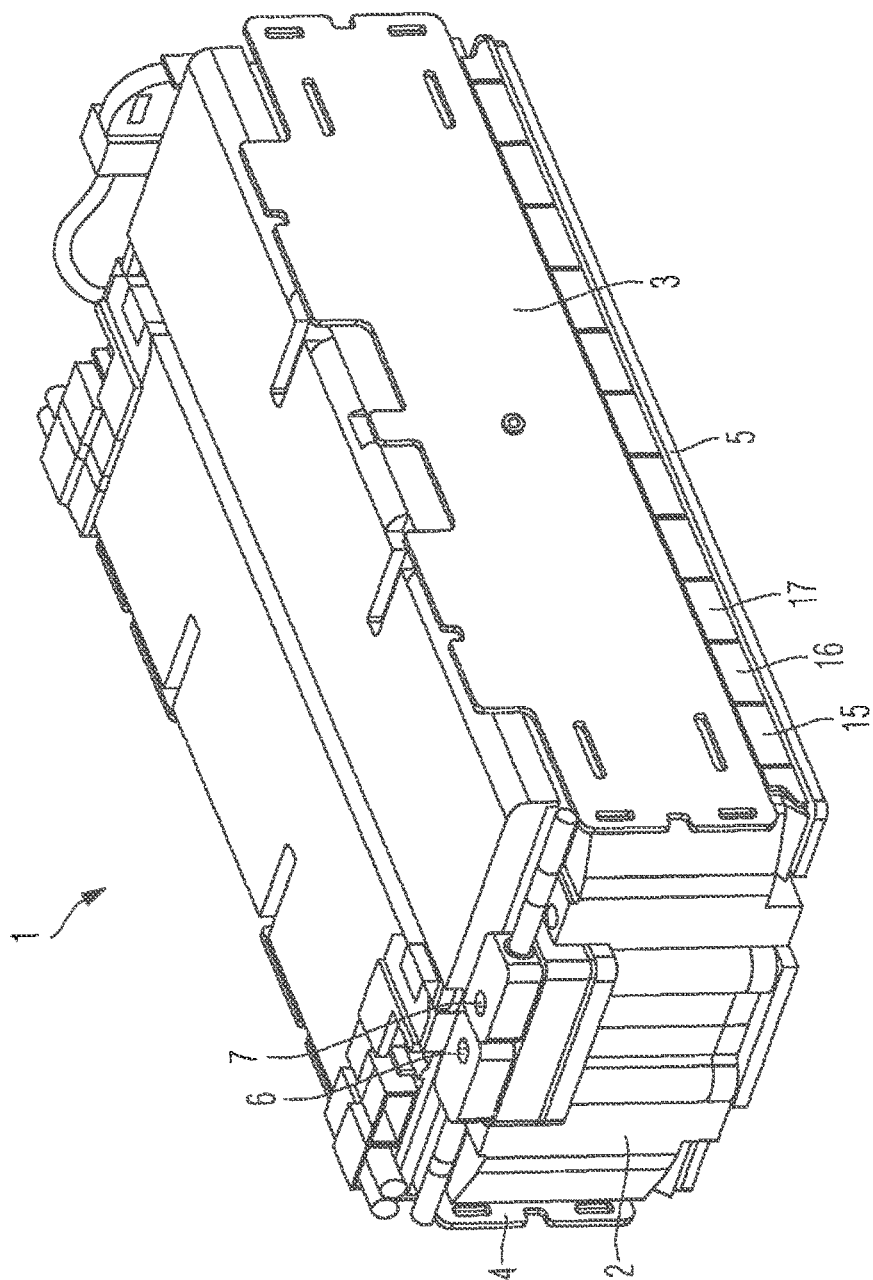
FIG. 1 is a perspective view of a cell module according to the invention.

FIG. 1 illustrates a cell module 1 of an electric energy storage device not shown herein detail, which may be provided for supplying power to the electric drive of a motor vehicle.

The cell module 1 has one pressure plate respectively on its face sides, of which here only the front pressure plate 2 is visible. Between the pressure plates, storage cells, which are not shown here in detail, are arranged behind one another in a nested fashion. The pressure plates are clamped together in the longitudinal direction of the cell module 1 on a front side and a back side of the cell module 1 by way of tension plates, in the following also called "tension straps" 3, 4.

The storage cells 15, 16, 17, etc., which are visible only in the lower area of the cell module in FIG. 1, stand up on a cooling plate 5. Bottom sides of the storage cells may be connected with the cooling plate 5 in a thermally well conducting manner by way of a thermally conducting adhesive or in a another fashion.

In the interior of the cooling plate 5, a cooling duct system is provided, which is not shown here in detail and through which, for example, a coolant or a refrigerant can flow. The cooling duct system of the cooling plate 5 is in a fluidic connection with a coolant inlet 6 and a coolant outlet 7, which are arranged in an "upper area", here on a top face of the front pressure plate 2. By way of the coolant inlet and the coolant outlet, the cooling duct system integrated into the cooling plate 5 can be connected to a coolant or refrigerant circuit of a vehicle, so that the storage cells of the cell module 1 can be actively cooled.

A coolant inlet and a coolant outlet can also be provided on the rearward face side of the cell module which is not visible in FIG. 1.

Figure 2:
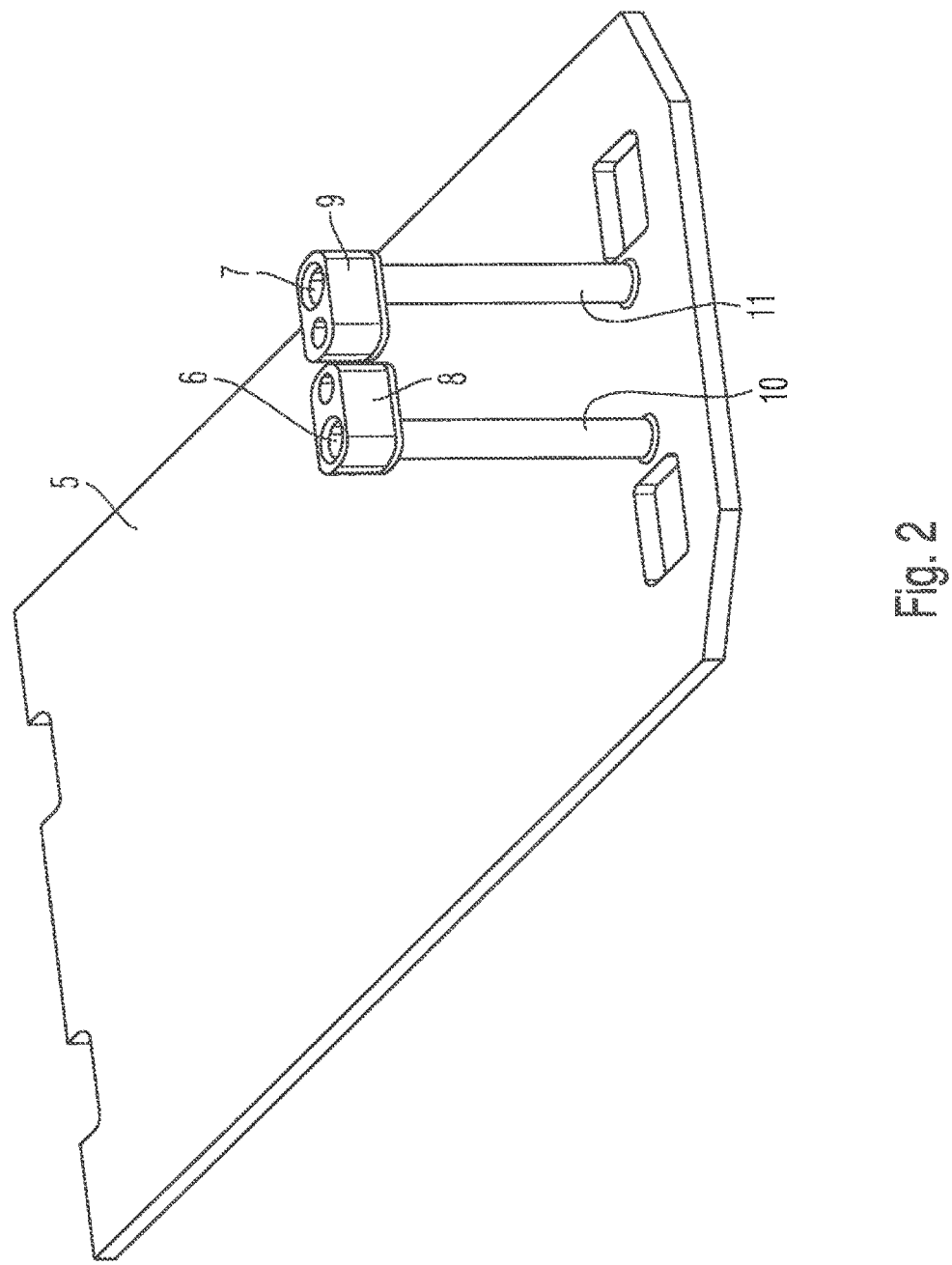
FIG. 2 is a view of a cooling element of a cell module with connection ducts projecting therefrom and an inlet and an outlet.

FIG. 2 illustrates the cooling plate 5 of FIG. 1 as a single representation. The coolant inlet 6 is formed by a first flange element 8. The coolant outlet 7 is formed by a second flange element 9. A first and second connection duct 10, 11 respectively is soldered to the bottom sides of the two flange elements 8, 9. The flange elements may also be in a fluidic connection with the connection ducts 10, 11 in a different manner. The connection ducts may, for example, be screwed to the flange elements. The lower ends of the connection ducts 10, 11 are again connected here in a material-bonding manner, for example, by way of soldered connections with the cooling duct system provided in the interior of the cooling plate 5.

By way of the coolant inlet 6, coolant or refrigerant can be pumped into the cooling duct system of the cooling plate 5, and warmed or heated coolant or refrigerant can be discharged from the cooling duct system by way of the coolant outlet 7.

Figure 3:
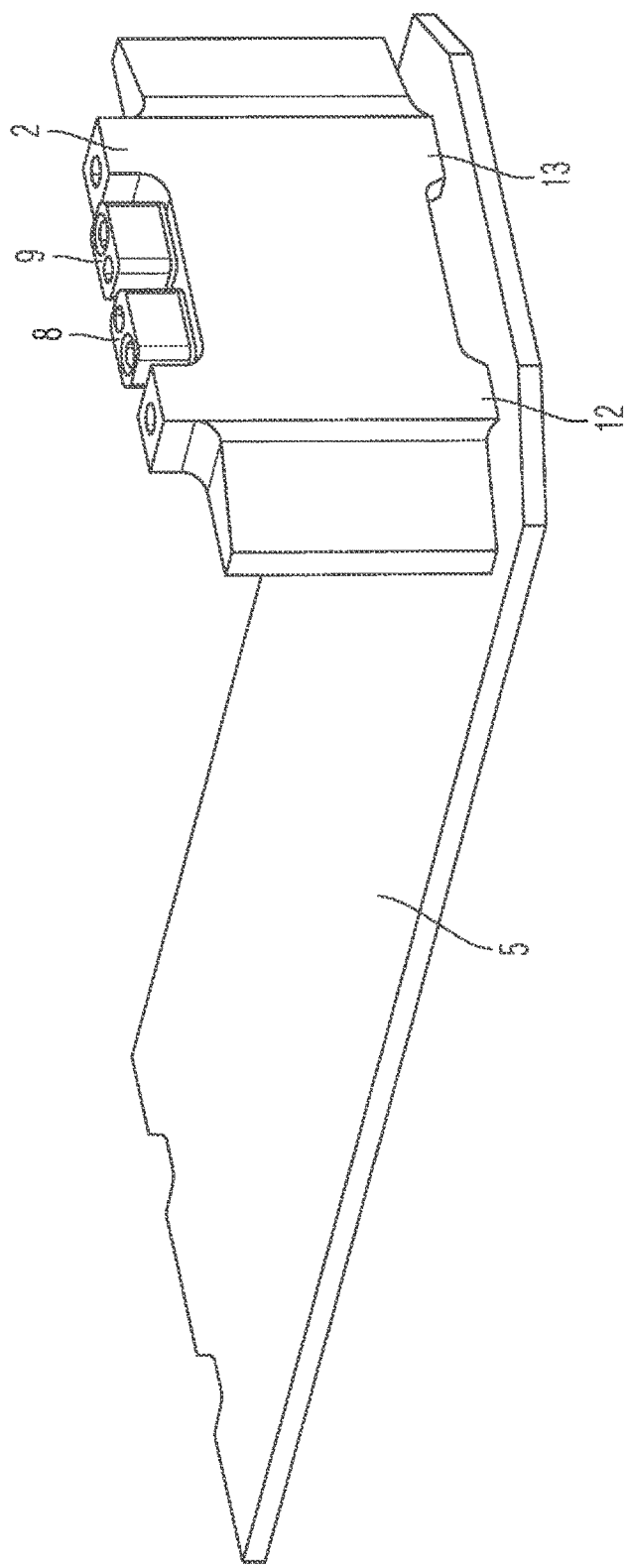
FIG. 3 is a view of the cooling element of FIG. 2 with a pressure plate slid onto the connection ducts.

FIG. 3 shows the cooling plate 5 of FIG. 2 with a pressure plate 2 "placed on" it. The pressure plate 2 has a left and a right support 12 and 13 respectively which, for the fastening in the housing projects through cooling plate 5. As an alternative to the above, the supports 12 and 13 respectively may also be situated farther upwards inside the pressure plate and be connected there with the storage device housing (compare FIG. 5).

A first duct assigned to the connection duct 10 and a second duct (not shown) assigned to the connection duct 11 are provided in the pressure plate 2. The two ducts penetrate the pressure plate 2 in the upward direction. During the mounting of the cell module, the connection ducts 10, 11 are first soldered to the assigned fluidic connections of the cooling duct system of the cooling plate 5. Subsequently, the pressure plate 2 placed, in which case the connection ducts 10, 11 are introduced into the ducts provided in the pressure plate 2. Subsequently, the flange elements 8, 9 are connected with the upper ends of the connection ducts 10, 11.

As an alternative to the above, the ducts in the pressure plate are open toward one side or the pressure plate is constructed in two parts, in order to be able to mount the plate also after the flanges 8, 9 were connected with the ducts (compare FIG. 2).

The rear pressure plate (not shown) is also mounted in the same manner. Before or after the mounting of the pressure plates, the individual storage cells can be set onto the top face of the cooling plate 5 or can be glued to the cooling plate 5.

Figure 4:
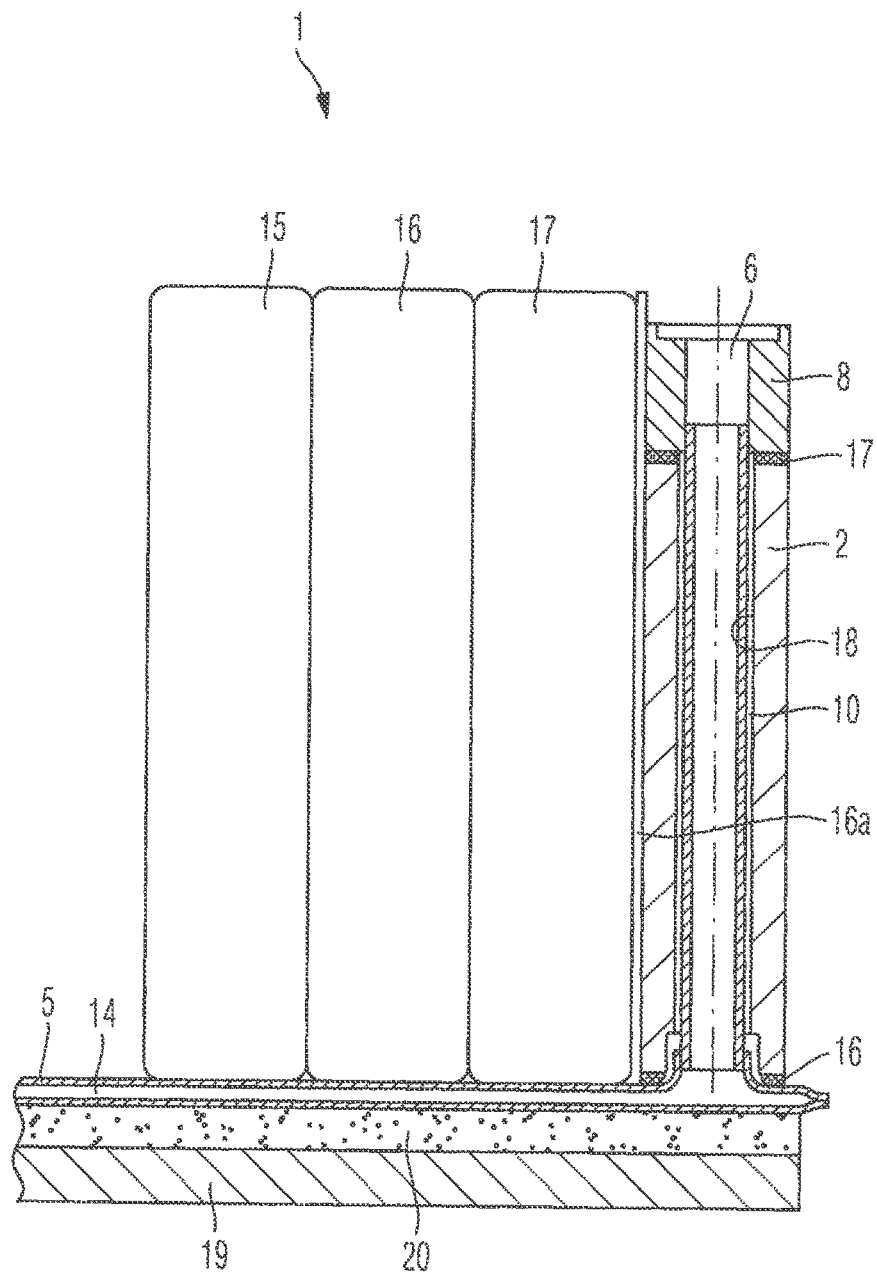
FIG. 4 is a longitudinal sectional view of a cell module according to the invention.

FIG. 4 is a longitudinal sectional view of the cell module 1. Several storage cells 15 to 17 are arranged behind one another in a nested manner on the cooling plate 5, in whose interior a cooling duct system 14 is provided. Bottom sides of the storage cells 15 to 17 can be glued, for example, by means of a thermally conducting adhesive, to a top face of the cooling plate 5.

As mentioned above, the cell packet formed by the storage cells is clamped together by means of the pressure plates mutually connected by way of the tension strap 3, 4 (compare FIG. 1), of which pressure plates only pressure plate 2 is shown.

Between the housing of the storage cell 17 and the pressure plate 2, an insulating layer 16 can be inserted, which thermally insulates the housing with respect to the pressure plate 2.

As illustrated in FIG. 4, the pressure plate 2 stands up on a top face of the cooling plate 5, in which case a thermal insulation 16 can be provided between a bottom side of the pressure plate and the top face of the cooling plate 5. The flange element 8 of the inlet 6 also sits on a top face of the pressure plate 2 by way of a thermal insulation 17.

As mentioned, above, the inlet 6 is in a fluidic connection with the cooling duct system 14 by way of the connection duct 10.

In the embodiment illustrated in FIG. 4, ducts penetrating the pressure plate 2 in the downward direction are provided in the pressure plate 2, of which here only one duct 18 is visible, into which the connection duct 10 is slid.

As shown in FIG. 4, the connection duct 10 is not, particularly not in direct contact with the duct 18, which has the result that the connection duct 10 is thermally insulted well with respect to the duct 18 and the pressure plate 2 respectively. None of the fluid-carrying components 5, 8, 10, etc. are therefore in direct contact with the pressure plate.

The cell module 1 only partially illustrated in FIG. 4 is arranged in a storage device housing, of which only a partial section 19 of the housing floor is visible. An insulation 20 is provided between a bottom side of the cooling plate 5 of the cell module 1 and a top face of the storage device housing floor 19. By means of the insulation 20, it is ensured that the cooling plate 5 does not cool the storage device housing or the storage device housing floor 19.

Figure 5:
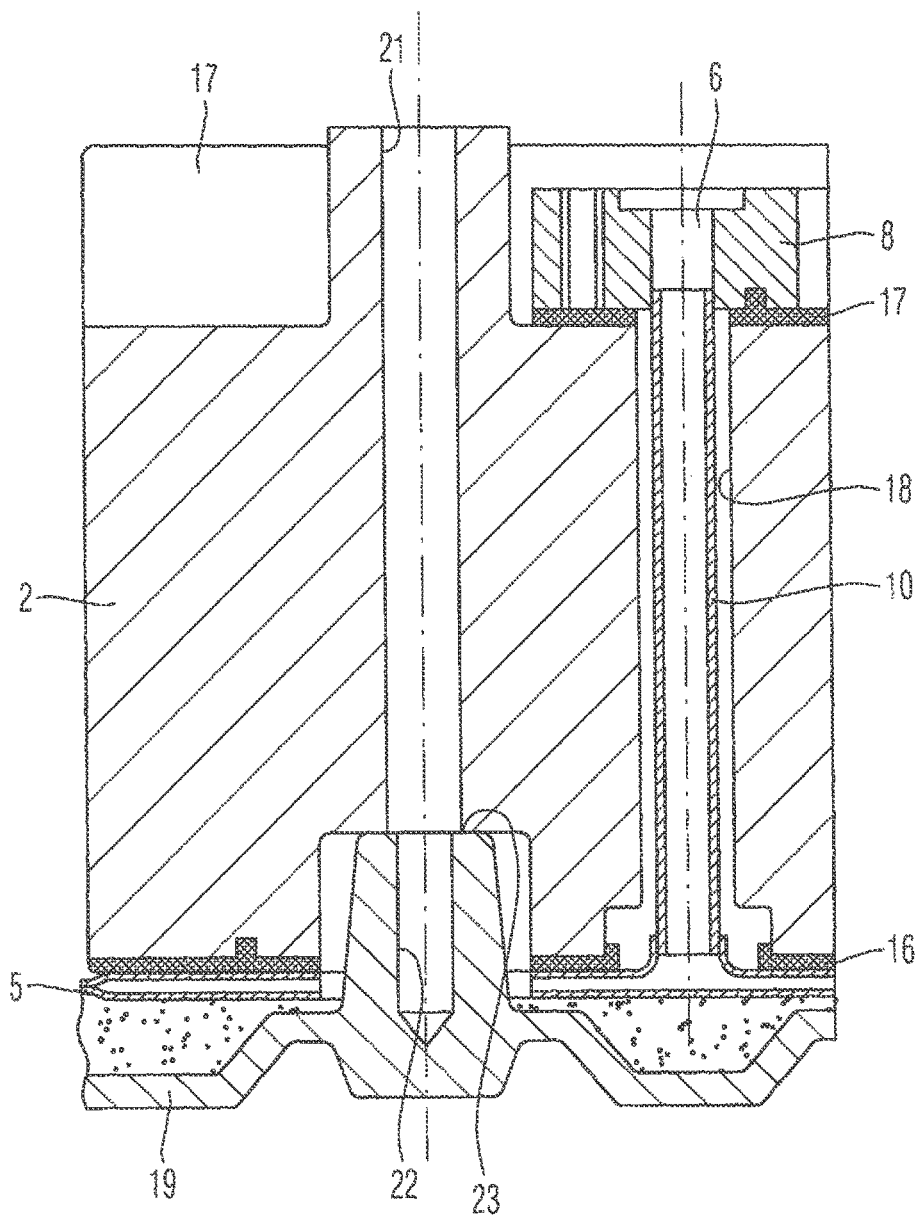
FIG. 5 is a sectional view of a pressure plate of a cell module that is perpendicular with respect to the longitudinal sectional of the figure.

FIG. 5 is a sectional view of the cell module perpendicular to the sectional view of FIG. 4, specifically in the area of the connection duct 10. In addition to the ducts, which are provided for accommodating the connection ducts, the pressure plate 2 has a bore 21 which is provided for accommodating a screw or threaded rod, by way of which the pressure plate 2 can be screwed to the storage device housing floor 19. For this purpose, a corresponding threaded bore 22 is provided in the storage device housing 19. By means of a screw or threaded rod, the pressure plate 2 is braced directly together with the storage device housing floor 19. The adhesive layer, which connects the bottom sides of the storage cells 15 to 17 with the top face of the cooling plate 5, will not be impaired thereby. An insulation is preferably also provided in an area in which the pressure plate 2 rests on a support 16a projecting upward from the storage device housing floor 19.

In order to furthermore uncouple the pressure plate 2 from the storage device housing, for example, when the connection duct 10 is not thermally uncoupled from the pressure plate or is integrated in the pressure plate 2, a thermally insulating element may be installed between the pressure plate 2 and the storage device housing floor 19, which element must be "hard" or should not flow, for a screwed connection of the arrangement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for supplying power to a motor vehicle, comprising:
    a cell module having a plurality of storage cells arranged between a first plate-type element and a second plate-type element; and
    a plate-type cooling element thermally conductively connected with bottom sides of the plurality of storage cells, a cooling duct system being provided in an interior of the plate-type cooling element, wherein the cooling duct system is in a fluidic connection with a coolant/refrigerant inlet and a coolant/refrigerant outlet,
    wherein the coolant/refrigerant inlet and/or the coolant/refrigerant outlet is arranged in an area of a top face of at least one of the first plate-type element and a second plate-type element,
    wherein, in an interior of at least one of the first plate-type element and the second plate-type element, a duct extending from the cooling duct system to the coolant/refrigerant inlet is provided and a duct extending from the cooling duct system to the coolant/refrigerant outlet is provided.

2. The arrangement according to claim 1, wherein the coolant/refrigerant inlet is connected by way of at least a first connection duct with the cooling duct system, and the coolant/refrigerant outlet is connected by way of at least a second connection duct with the cooling duct system.

3. The arrangement according to claim 2, wherein the duct extending from the cooling duct system to the coolant/refrigerant inlet forms the first connection duct, and the duct extending from the cooling duct system to the coolant/refrigerant outlet forms the second connection duct, the coolant or refrigerant flowing directly in the ducts.

4. The arrangement according to claim 2, wherein the first and second connection ducts are separate components which are arranged in the duct extending from the cooling duct system to the coolant/refrigerant inlet and in the duct extending from the cooling duct system to the coolant/refrigerant outlet, respectively.

5. The arrangement according to claim 4, wherein the first and second connection ducts are thermally insulated with respect to the ducts in which they are respectively arranged such that the first and second connection ducts are not in direct contact with the ducts.

6. The arrangement according to claim 2, wherein the first and second connection ducts are connected with the cooling duct system in a material-bonding manner.

7. The arrangement according to claim 2,
    wherein the coolant/refrigerant inlet and the coolant/refrigerant outlet are formed by flange elements, which are one of (i) connected with one of the first and second connection ducts, and (i) an integral component of the first and second plate-type elements, respectively.

8. The arrangement according to claim 2, wherein the cooling duct system, the first and second connection ducts, the coolant/refrigerant inlet and the coolant/refrigerant outlet are configured for flowing-through by a refrigerant.

9. The arrangement according to claim 1, wherein the coolant/refrigerant inlet and/or the coolant/refrigerant outlet is an integral component of at least one of the first plate-type element and the second plate-type element.

10. The arrangement of claim 1, wherein the bottom sides and/or side faces of the plurality of storage cells are glued to a top face of the cooling element.

11. The arrangement according to claim 1, wherein the cell module and the cooling element are inserted into a storage device housing, the cooling element being thermally insulated with respect to the storage device housing such that it does not come in direct contact with the storage device housing.

12. The arrangement according to claim 1, wherein the first plate-type element and the second plate-type element stand up by way of supports on a floor of a storage device housing in which the arrangement is disposed.

13. The arrangement according to claim 1, wherein the first plate-type element and the second plate-type element are mutually connected by means of a left and a right tension element, respectively, wherein the cell module is clamped in by means of said left and right tension elements between the first plate-type element and the second plate-type element.

14. The arrangement according to claim 1, wherein the first plate-type element and the second plate-type element stand up on a top face of the plate-type cooling element.

15. The arrangement according to claim 14, wherein the duct extending from the cooling duct system to the coolant/refrigerant inlet and the duct extending from the cooling duct system to the coolant/refrigerant outlet each penetrate the top face of the plate-type cooling element.

\* \* \* \* \*